US00RE43700E

(19) United States
(12) Reissued Patent
Chen

(10) Patent Number: US RE43,700 E
(45) Date of Reissued Patent: Oct. 2, 2012

(54) VIRTUAL REALITY CAMERA

(75) Inventor: Shenchang Eric Chen, Los Gatos, CA (US)

(73) Assignee: Intellectual Ventures I LLC, Wilmington, DE (US)

(21) Appl. No.: 11/113,455

(22) Filed: Apr. 22, 2005

Related U.S. Patent Documents

Reissue of:
(64) Patent No.: 6,552,744
Issued: Apr. 22, 2003
Appl. No.: 08/938,366
Filed: Sep. 26, 1997

(51) Int. Cl.
*H04N 5/225* (2006.01)

(52) U.S. Cl. ..... 348/218.1; 348/207.99; 348/36; 348/239

(58) Field of Classification Search ..... 348/143, 348/36, 39, 218.1, 222.1, 239, 333.01, 281.1, 348/207.99
See application file for complete search history.

(56) References Cited

U.S. PATENT DOCUMENTS 5,262,867 A 11/1993 Kojima
5,424,773 A 6/1995 Saito
5,444,478 A 8/1995 Lelong et al.
5,528,290 A 6/1996 Saund
5,625,409 A 4/1997 Rosier et al.
5,646,679 A 7/1997 Yano et al.
5,650,814 A 7/1997 Florent et al.
5,907,353 A 5/1999 Okauchi
6,009,190 A 12/1999 Szeliski et al.
6,011,558 A 1/2000 Hsieh et al.
6,078,701 A * 6/2000 Hsu et al. ..... 382/294
6,552,744 B2 4/2003 Chen

OTHER PUBLICATIONS

Karney, J. "Casio QV-200, QV-700," PC Magazine, Feb. 10, 1998, 2 pgs.
"Round Shot Model Super 35," Seitz, http://www.roundshot.com/rssup35.htm, 1997, 4 pgs.
Farace, J., "Casio QV700 Digital Camera & DP-8000 Digital Photo Printer," Nov. 6, 1997, 3 pgs.
"Round Shot," 4 pgs.
Erickson, B. "Round Shot Super 35," May 13, 1996, 1 pg.
International Search Report; Application No. PCT/US98/13465; Applicant: Live Picture, Inc.; Mailed Oct. 19, 1998. 5 pgs.
Ryer, K., "Casio Adds New Camera To Its Lineup," MacWeek, Oct. 2, 1997, vol. 11, Issue 38, 1 pg.
"Round Shot Model Super 35", Seitz, 4 pp., 1997.
"Casio QV700 Digital Camera & DP-8000 Digital Photo Printer", Joe Farace, 3 pp., Nov. 6, 1997.
"Round Shot", 4 pp.
PCT Search Report, PCT/US98/13465, mailed Oct. 19, 1998.

* cited by examiner

*Primary Examiner* — Tuan Ho
(74) *Attorney, Agent, or Firm* — Perkins Coie LLP

(57) ABSTRACT

A method and apparatus for creating and rendering multiple-view images. A camera includes an image sensor to receive images, sampling logic to digitize the images and a processor programmed to combine the images based upon a spatial relationship between the images.

108 Claims, 9 Drawing Sheets

VIRTUAL REALITY CAMERA

Matter enclosed in heavy brackets [ ] appears in the original patent but forms no part of this reissue specification; matter printed in italics indicates the additions made by reissue.

*CROSS-REFERENCE TO RELATED APPLICATION*

*This patent application is a reissue application for U.S. Pat. No. 6,552,744, issued from U.S. patent application Ser. No. 08/938,366, filed on Sep. 26, 1997.*

FIELD OF THE INVENTION

The present invention relates to the field of photography, and more particularly to a camera that combines images based on a spatial relationship between the images.

BACKGROUND OF THE INVENTION

A panoramic image of a scene has traditionally been created by rotating a vertical slit camera about an optical center. Using this technique, film at the optical center is continuously exposed to create a wide field of view (e.g., a 360° field of view). Because of their specialized design, however, vertical slit cameras are relatively expensive. Further, because the panoramic image is captured in a continuous rotation of the camera, it is difficult to adjust the camera to account for changes in the scene, such as lighting or focal depth, as the camera is rotated.

In a more modern technique for creating panoramic images, called "image stitching", a scene is photographed from different camera orientations to obtain a set of discrete images. The discrete images of the scene are then transferred to a computer which executes application software to blend the discrete images into a panoramic image.

After the panoramic image is created, application software may be executed to render user-specified portions of the panoramic image onto a display. The effect is to create a virtual environment that can be navigated by a user. Using a mouse, keyboard, headset or other input device, the user can pan about the virtual environment and zoom in or out to view objects of interest.

One disadvantage of existing image stitching techniques is that photographed images must be transferred from the camera to the computer before they can be stitched together to create a navigable panoramic image. For example, with a conventional exposed-film camera, film must be exposed, developed, printed and digitized (e.g., using a digital scanner) to obtain a set of images that can be stitched into a panoramic image. In a digital camera, the process is less cumbersome, but images must still be transferred to a computer to be stitched into a panoramic view.

Another disadvantage of existing image stitching techniques is that the orientation of the camera used to photograph each discrete image is typically unknown. This makes it more difficult to stitch the discrete images into a panoramic image because the spatial relationship between the constituent images of the panoramic image are determined, at least partly, based on the respective orientations of the camera at which they were captured. In order to determine the spatial relationship between a set of images that are to be stitched into a panoramic image, application software must be executed to prompt the user for assistance, hunt for common features in the images, or both.

Yet another disadvantage of existing image stitching techniques is that it is usually not possible to determine whether there are missing views in the set of images used to create the panoramic image until after the images have been transferred to the computer and stitched. Depending on the subject of the panoramic image, it may be inconvenient or impossible to recreate the scene necessary to obtain the missing view. Because of the difficulty determining whether a complete set of images has been captured, images to be combined into a panoramic image are typically photographed with conservative overlap to avoid gaps in the panoramic image. Because there is more redundancy in the captured images, however, a greater number of images must be obtained to produce the panoramic view. For conventional film cameras, this means that more film must be exposed, developed, printed and scanned to produce a panoramic image than if less conservative image overlap were possible. For digital cameras, more memory must typically be provided to hold the larger number of images that must be captured than if less conservative image overlap were possible.

SUMMARY OF THE INVENTION

A method and apparatus for creating and rendering multiple-view images are disclosed. Images are received on the image sensor of a camera and digitized by sampling logic in the camera. The digitized images are combined by a programmed processor in the camera based upon a spatial relationship between the images.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to the present invention, a virtual reality (VR) camera is provided to create and render panoramic images and other multiple-view images. In one embodiment, the VR camera includes a sensor to detect the camera orientation at which images in a scene are captured. A computer within the VR camera combines the images of the scene into a panoramic image based, at least partly, on the respective camera orientations at which the images were captured. A display in the VR camera is used to view the panoramic image. In one embodiment of the present invention, the orientation of the VR camera is used to select which portion of the panoramic image is displayed so that a user can effectively pan about the panoramic image by changing the orientation of the camera.

Figure 1:
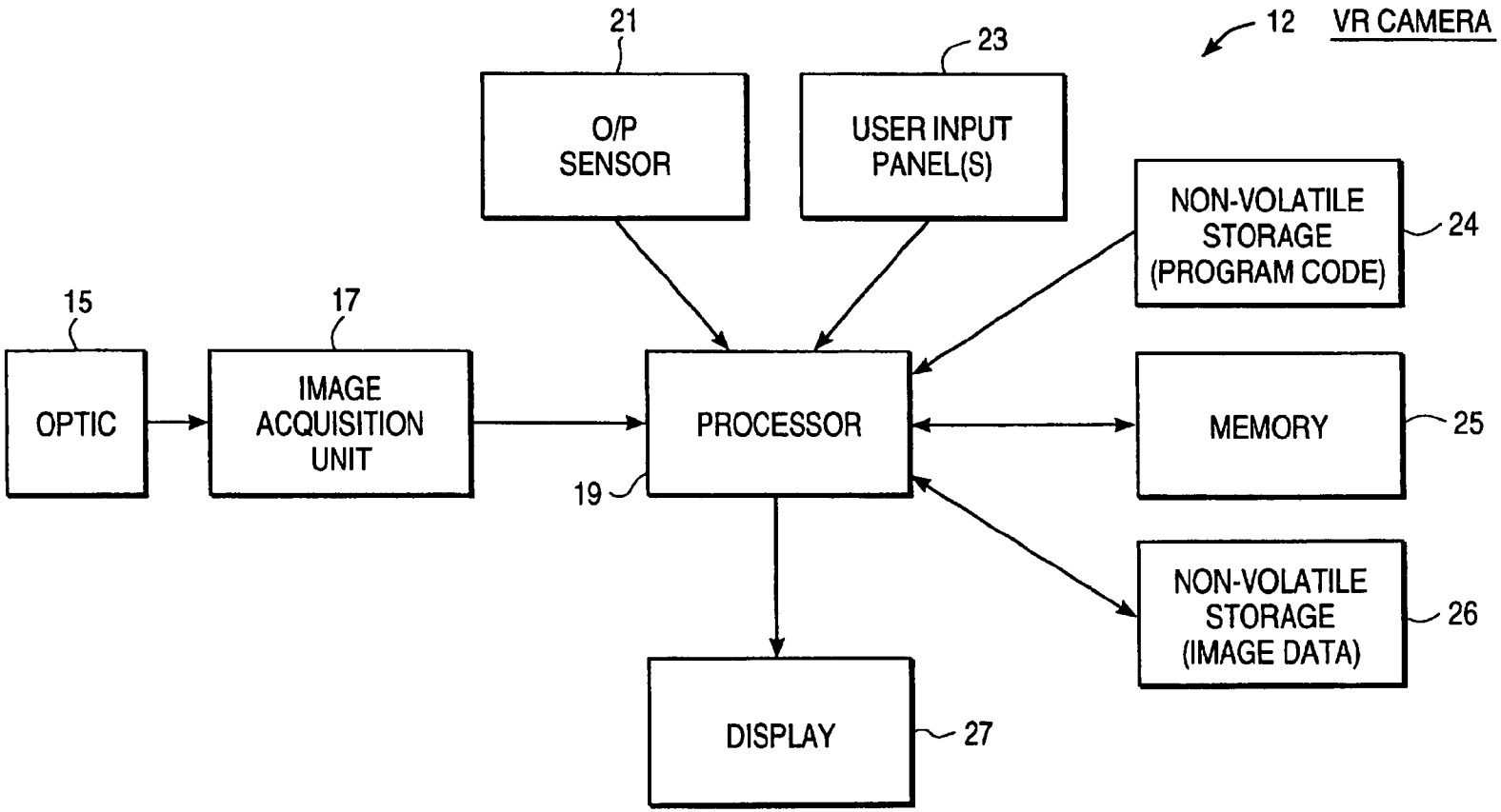
FIG. 1 is a block diagram of a virtual reality (VR) camera.

FIG. 1 is a block diagram of a VR camera 12 according to one embodiment of the present invention. VR camera 12 may be either a video camera or a still-image camera and includes an optic 15, an image acquisition unit (IAU) 17, an orientation/position sensor (O/P sensor) 21, one or more user input panels 23, a processor 19, a non-volatile program code storage 24, a memory 25, a non-volatile data storage 26 and a display 27.

The optic 15 generally includes an automatically or manually focused lens and an aperture having a diameter that is adjustable to allow more or less light to pass. The lens projects a focused image through the aperture and onto an image sensor in the IAU 17. The image sensor is typically a charge-coupled device (CCD) that is sampled by sampling logic in the IAU 17 to develop a digitized version of the image. The digitized image may then be read directly by the processor 19 or transferred from the IAU 17 to the memory 25 for later access by the processor 19. Although a CCD sensor has been described, any type of image sensor that can be sampled to generate digitized images may be used without departing from the scope of the present invention.

In one embodiment of the present invention, the processor 19 fetches and executes program code stored in the code storage 24 to implement a logic unit capable of obtaining the image from the IAU 17 (which may include sampling the image sensor), receiving orientation and position information from the O/P sensor 21, receiving input from the one or more user input panels 23 and outputting image data to the display 27. It will be appreciated that multiple processors, or hard-wired logic may alternatively be used to perform these functions. The memory 25 is provided for temporary storage of program variables and image data, and the non-volatile image storage 26 is provided for more permanent storage of image data. The non-volatile storage 26 may include a removable storage element, such as a magnetic disk or tape, to allow panoramic and other multiple-view images created using the VR camera 12 to be stored indefinitely.

The O/P sensor 21 is used to detect the orientation and position of the VR camera 12. The orientation of the VR camera 12 (i.e., pitch, yaw and roll) may be determined relative to an arbitrary starting orientation or relative to a fixed reference (e.g., earth's gravitational and magnetic fields). For example, an electronic level of the type commonly used in virtual reality headsets can be used to detect camera pitch and roll (rotation about horizontal axes), and an electronic compass can be used to detect camera yaw (rotation about a vertical axis). As discussed below, by recording the orientation of the VR camera 12 at which each of a set of discrete images is captured, the VR camera 12 can automatically determine the spatial relationship between the discrete images and combine the images into a panoramic image, planar composite image, object image or any other type of multiple-view image.

Still referring to FIG. 1, when a panoramic image (or other multiple-view image) is displayed on display 27, changes in camera orientation are detected via the O/P sensor 21 and interpreted by the processor 19 as requests to pan about the panoramic image. Thus, by rotating the VR camera 12 in different directions, a user can view different portions of the previously generated panoramic image on the display 27. The VR camera's display 27 becomes, in effect, a window into a virtual environment that has been created in the VR camera 12.

In one embodiment of the present invention, the position of the VR camera 12 in a three-dimensional (3D) space is determined relative to an arbitrary or absolute reference. This is accomplished, for example, by including in the O/P sensor 21 accelerometers or other devices to detect translation of VR the camera 12 relative to an arbitrary starting point. As another example, the absolute position of the VR camera 12 may be determined including in the O/P sensor 21 a sensor that communicates with a global positioning system (GPS). GPS is well known to those of ordinary skill in the positioning and tracking arts. As discussed below, the ability to detect translation of the VR camera 12 between image capture positions is useful for combining discrete images to produce a composite image of a surface.

It will be appreciated from the foregoing discussion that the O/P sensor 21 need not include both an orientation sensor and a position sensor, depending on the application of the VR camera 12. For example, to create and render a panoramic image, it is usually necessary to change the angular orientation of the VR camera 12 only. Consequently, in one embodiment of the present invention, the O/P sensor 21 is an orientation sensor only. Other combinations of sensors may be used without departing from the scope of the to present invention.

Still referring to FIG. 1, the one or more user input panels 23 may be used to provide user control over such conventional camera functions as focus and zoom (and, at least in the case of a still camera, aperture size, shutter speed, etc.). As discussed below, the input panels 23 may also be used to receive user requests to pan about or zoom in and out on a panoramic image or other multiple-view image. Further, the input panels 23 may be used to receive user requests to set certain image capture parameters, including parameters that indicate the type of composite image to be produced, whether certain features are enabled, and so forth. It will be appreciated that focus and other camera settings may be adjusted using a traditional lens dial instead of an input panel 23. Similarly, other types of user input devices and techniques, including, but not limited to, user rotation and translation of the VR camera 12, may be used to receive requests to pan about or zoom in or out on an image.

The display 27 is typically a liquid crystal display (LCD) but may be any type of display that can be included in the VR camera 12, including a cathode-ray tube display. Further, as discussed below, the display 27 may be a stereo display designed to present left and right stereo images to the left and right eyes, respectively, of the user.

Figure 2:
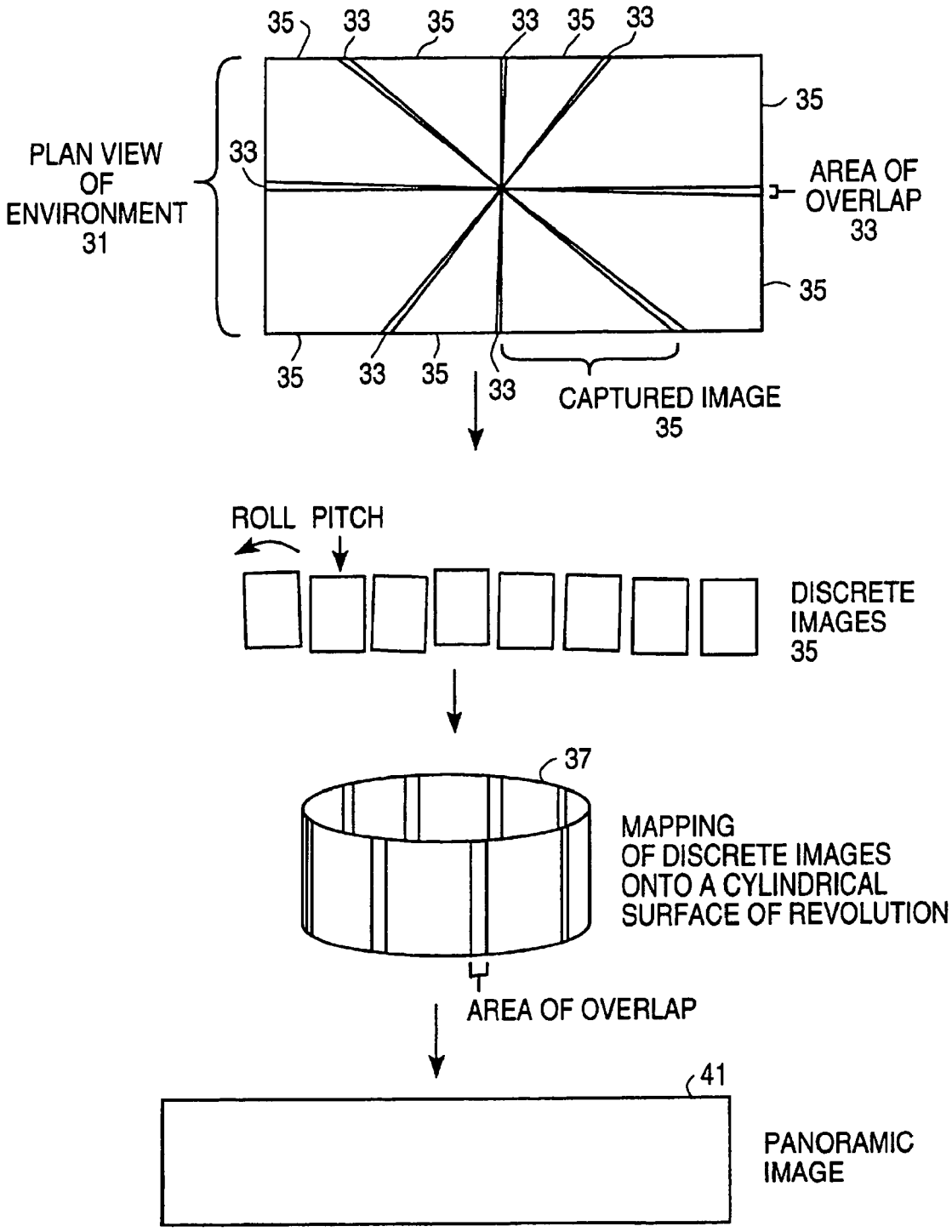
FIG. 2 illustrates the use of a VR camera to generate a panoramic image.

FIG. 2 illustrates use of the VR camera 12 of FIG. 1 to generate a panoramic image 41. A panoramic image is an image that represents a wide-angle view of a scene and is one of a class of images referred to herein as multiple-view images. A multiple-view image is an image or collection of images that is displayed in user-selected portions.

To create panoramic image 41, a set of discrete images 35 is first obtained by capturing images of an environment 31 at different camera orientations. With a still camera, capturing images means taking photographs. With a video camera, capturing image refers to generating one or more video frames of each of the discrete images.

For ease of understanding, the environment 31 is depicted in FIG. 2 as being an enclosed space but this is not necessary. In order to avoid gaps in the panoramic image, the camera is oriented such that each captured image overlaps the preceding captured image. This is indicated by the overlapped regions 33. The orientation of the VR camera is detected via the O/P sensor (e.g., element 21 of FIG. 1) and recorded for each of the discrete images 35.

In one still-image camera embodiment of the present invention, as the user pans the camera about the environment 31, the orientation sensor is monitored by the processor (e.g., element 19 of FIG. 1) to determine when the next photograph should be snapped. That is, the VR camera assists the photographer in determining the camera orientation at which each new discrete image 35 is to be snapped by signaling the photographer (e.g., by turning on a beeper or a light) when region of overlap 33 is within a target size. Note that the VR camera may be programmed to determine when the region of overlap 33 is within a target size not only for camera yaw, but also for camera pitch or roll. In another embodiment of the present invention, the VR camera may be user-configured (e.g., via a control panel 23 input) to automatically snap a photograph whenever it detects sufficient change in orientation. In both manual and automatic image acquisition modes, the difference between camera orientations at which successive photographs are acquired may be input by the user or automatically determined by the VR camera based upon the camera's angle of view and the distance between the camera and subject.

In a video camera embodiment of the present invention, the orientation sensor may be used to control the rate at which video frames are generated so that frames are generated only when the O/P sensor indicates sufficient change in orientation (much like the automatic image acquisition mode of the still camera discussed above), or video frames may be generated at standard rates with redundant frames being combined or discarded during the stitching process.

As stated above, the overlapping discrete images 35 can be combined based on their spatial relationship to form a panoramic image 41. Although the discrete images 35 are shown as being a single row of images (indicating that the images were all captured at approximately same pitch angle), additional rows of images at higher or lower pitch angles could also have been obtained. Further, because the VR camera will typically be hand held (although a tripod may be used), a certain amount of angular error is incurred when the scene is recorded. This angular error is indicated in FIG. 2 by the slightly different pitch and roll orientation of the discrete images 35 relative to one another, and must be accounted for when the images are combined to form the panoramic image 41.

After the discrete images 35 have been captured and stored in the memory of the camera (or at least two of the discrete image have been captured and stored), program code is executed in the VR camera to combine the discrete images 35 into the panoramic image 41. This is accomplished by determining a spatial relationship between the discrete images 35 based on the camera orientation information recorded for each image 35, or based on common features in the overlapping regions of the images 35, or based on a combination of the two techniques.

One technique for determining a spatial relationship between images based on common features in the images is to "cross-correlate" the images. Consider, for example, two images having an unknown translational offset relative to one another. The images can be cross-correlated by "sliding" one image over the other image one step (e.g., one pixel) at a time and generating a cross-correlation value at each sliding step. Each cross-correlation value is generated by performing a combination of arithmetic operations on the pixel values within the overlapping regions of the two images. The offset that corresponds to the sliding step providing the highest correlation value is found to be the offset of the two images. Cross-correlation can be applied to finding offsets in more than one direction or to determine other unknown transformational parameters, such as rotation or scaling. Techniques other than cross-correlation, such as pattern matching, can also be used to find unknown image offsets and other transformational parameters.

Based on the spatial relationship between the discrete images 35, the images 35 are mapped onto respective regions of a smooth surface such as a sphere or cylinder. The regions of overlap 33 are blended in the surface mapping. Depending on the geometry of the surface used, pixels in the discrete images 35 must be repositioned relative to one another in order to produce a two-dimensional pixel-map of the panoramic image 41. For example, if the discrete images 35 are mapped onto a cylinder 37 to produce the panoramic image 41, then horizontal lines in the discrete images 35 will become curved when mapped onto the cylinder 37 with the degree of curvature being determined by latitude of the horizontal lines above the cylindrical equator. Thus, stitching the discrete images 35 together to generate a panoramic image 41 typically involves mathematical transformation of pixels to produce a panoramic image 41 that can be rendered without distortion.

Figure 3:
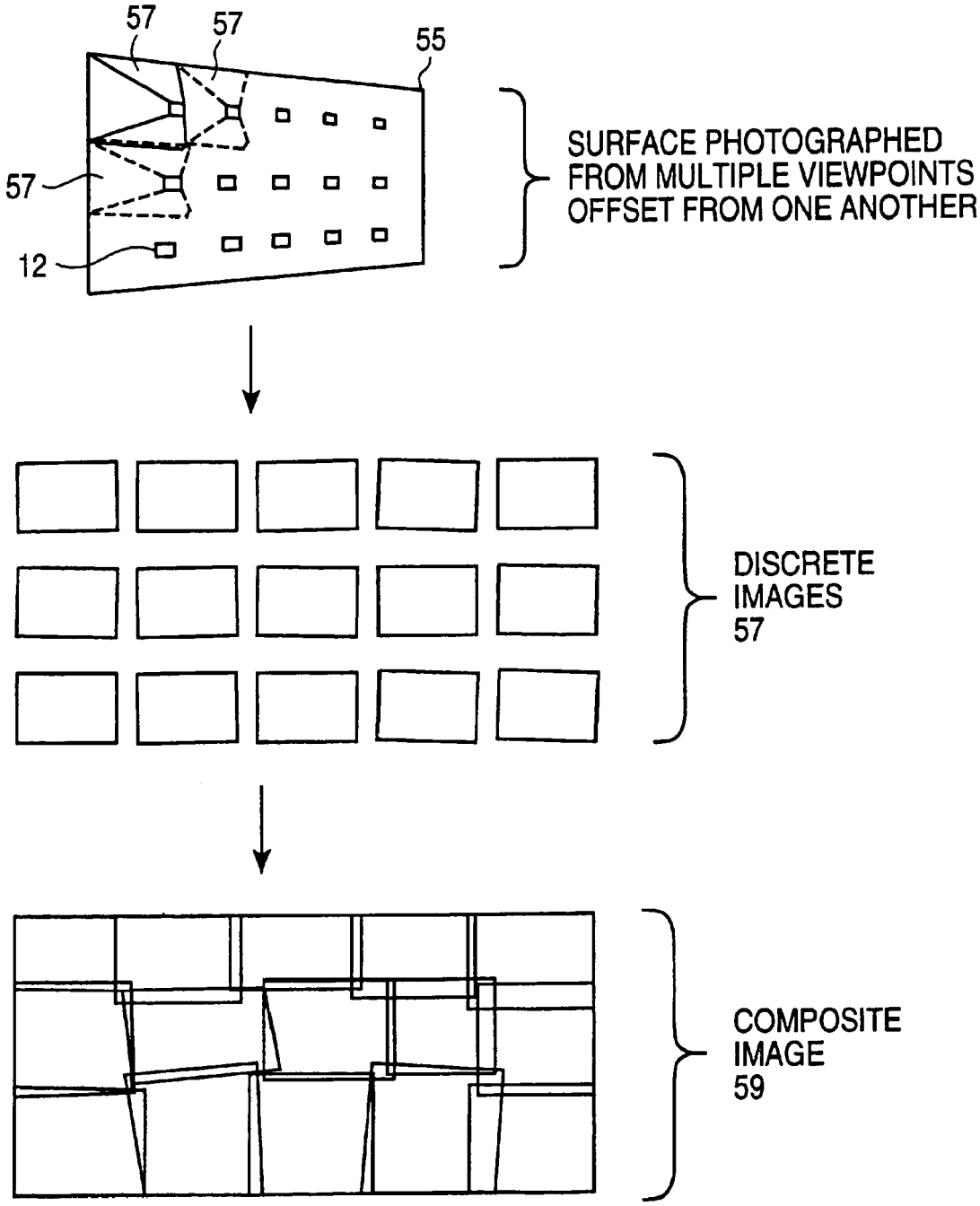
FIG. 3 illustrates the use of a VR camera to generate a composite image of a surface.

FIG. 3 illustrates the use of the VR camera 12 to generate a composite image of a surface 55 that is too detailed to be adequately represented in a single photograph. Examples of such surfaces include a white-board having notes on it, a painting, an inscribed monument (e.g., the Viet Nam War Memorial), and so forth.

As indicated in FIG. 3, multiple discrete images 57 of the surface 55 are obtained by translating the VR camera 12 between a series of positions and capturing a portion of the surface 55 at each position. According to one embodiment of the present invention, the position of the VR camera 12 is obtained from the position sensing portion of the O/P sensor (element 21 of FIG. 1) and recorded for each discrete image 57. This allows the spatial relationship between the discrete images 57 to be determined no matter the order in which the images 57 are obtained. Consequently, the VR camera is able to generate an accurate composite image 59 of the complete surface 55 regardless of the order in which the discrete images 57 are captured. In the case of a still image camera, the position sensor can be used to signal the user when the VR camera 12 has been sufficiently translated to take a new photograph. Alternatively, the VR camera may be user-configured to automatically snap photographs as the VR camera 12 is swept across the surface 55. In the case of a video camera, the position sensor can be used to control when each new video frame is generated, or video frames may be generated at the standard rate and then blended or discarded based on position information associated with each.

After two or more of the discrete images 57 have been stored in the memory of the VR camera 12, program code can be executed to combine the images into a composite image 59 based on the position information recorded for each discrete image 57, or based on common features in overlapping regions of the discrete images 57, or both. After the discrete images 57 have been combined into a composite image 59, the user may view different portions of the composite image 59 on the VR camera's display by changing the orientation of the VR camera 12 or by using controls on a user input panel. By zooming in at a selected portion of the image, text on a white-board, artwork detail, inscriptions on a monument, etc. may be easily viewed. Thus, the VR camera 12 provides a simple and powerful way to digitize and render high resolution surfaces with a lower resolution camera. Composite images of such surfaces are referred to herein as "planar composite images", to distinguish them from panoramic images.

Figure 4:
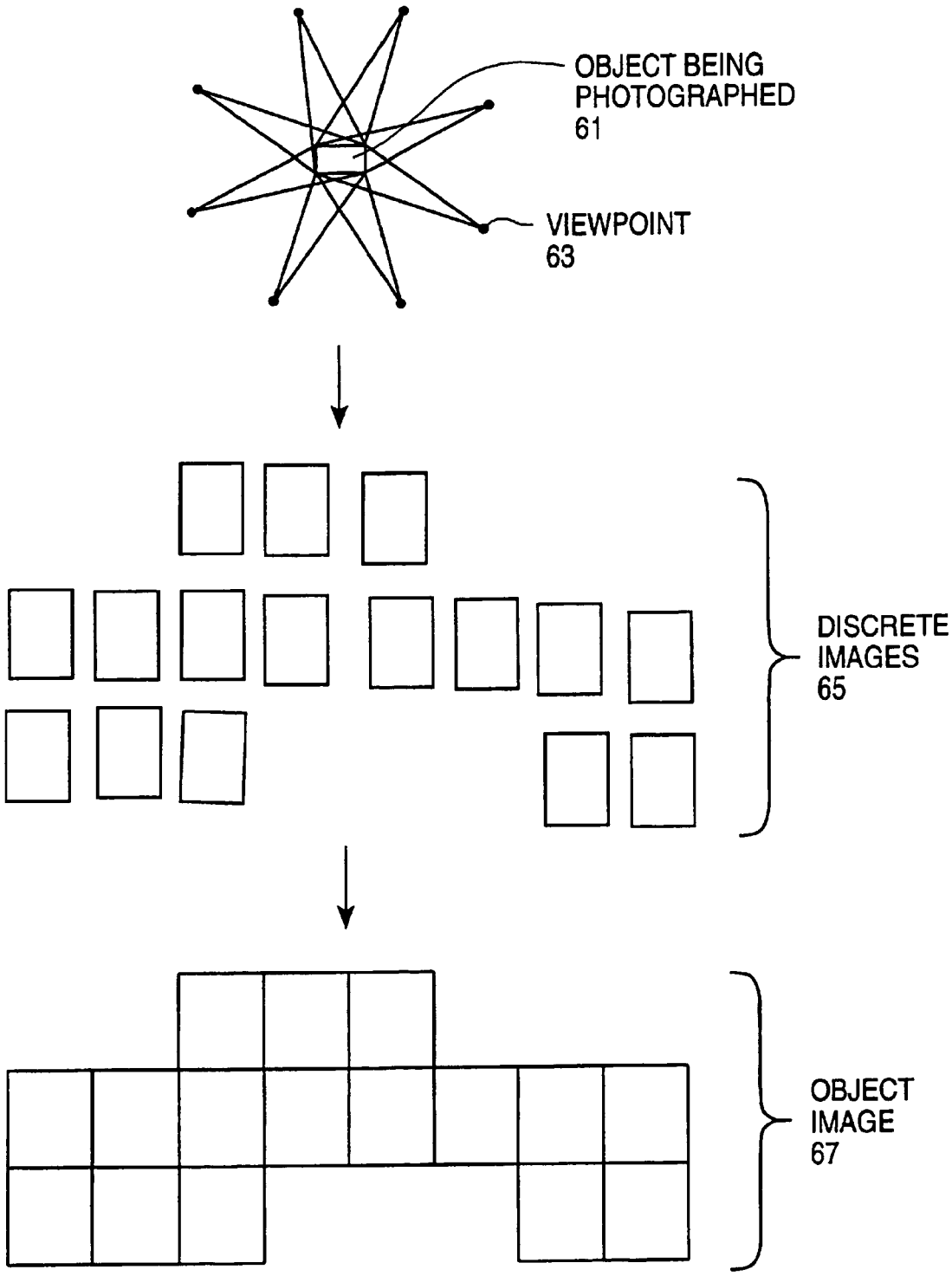
FIG. 4 illustrates the use of a VR camera to generate an object image.

FIG. 4 illustrates yet another application of the VR camera. In this case the VR camera is used to combine images into an object image 67. An object image is a set of discrete images that are spatially related to one another, but which have not been stitched together to form a composite image. The combination of images into an object image is accomplished by providing information indicating the location of the discrete images relative to one another and not by creating a separate composite image.

As shown in FIG. 4, images of an object 61 are captured from surrounding points of view 63. Though not shown in the plan view of the object 61, the VR camera may also be moved over or under the object 61, or may be raised or tilted to capture images of the object 61 at different heights. For example, the first floor of a multiple-story building could be captured in one sequence of video frames (or photographs), the second floor in a second sequence of video frames, and so forth. If the VR camera is maintained at an approximately fixed distance from the object 61, the orientation of the VR camera alone may be recorded to establish the spatial relationship between the discrete images 65. If the object is filmed (or photographed) from positions that are not equidistant to the object 61, it may be necessary to record both the position and orientation of the VR camera for each discrete image 65 in order to produce a coherent objec image 67.

After two or more discrete images 65 of object 61 have been obtained, they can be combined based upon the spatial relationship between them to form an object image 67. As stated above, combining the discrete images 65 to form an object image 67 typically does not involve stitching the discrete images 65 and is instead accomplished by associating with each of the discrete images 65 information that indicates the image's spatial location in the object image 67 relative to other images in the object image 67. This can be accomplished, for example, by generating a data structure having one member for each discrete image 65 and which indicates neighboring images and their angular or positional proximity. Once the object image 67 is created, the user can pan through the images 65 by changing the orientation of the camera. Incremental changes in orientation can be used to select an image in the object image 67 that neighbors a previously displayed image. To the user, rendering of the object image 67 in this manner provides a sense of moving around, over and under the object of interest.

According to another embodiment of the present invention, the relative spatial location of each image in the object image 67 an object image is provided by creating a data structure containing the camera orientation information recorded for each discrete image 65. To select a particular image in the object image 67, the user orients the VR camera in the direction that was used to capture the image. The VR camera's processor detects the orientation via the orientation sensor, and then searches the data structure to identify the discrete image 65 having a recorded orientation most nearly matching the input orientation. The identified image 65 is then displayed on the VR camera's display.

Figure 5:
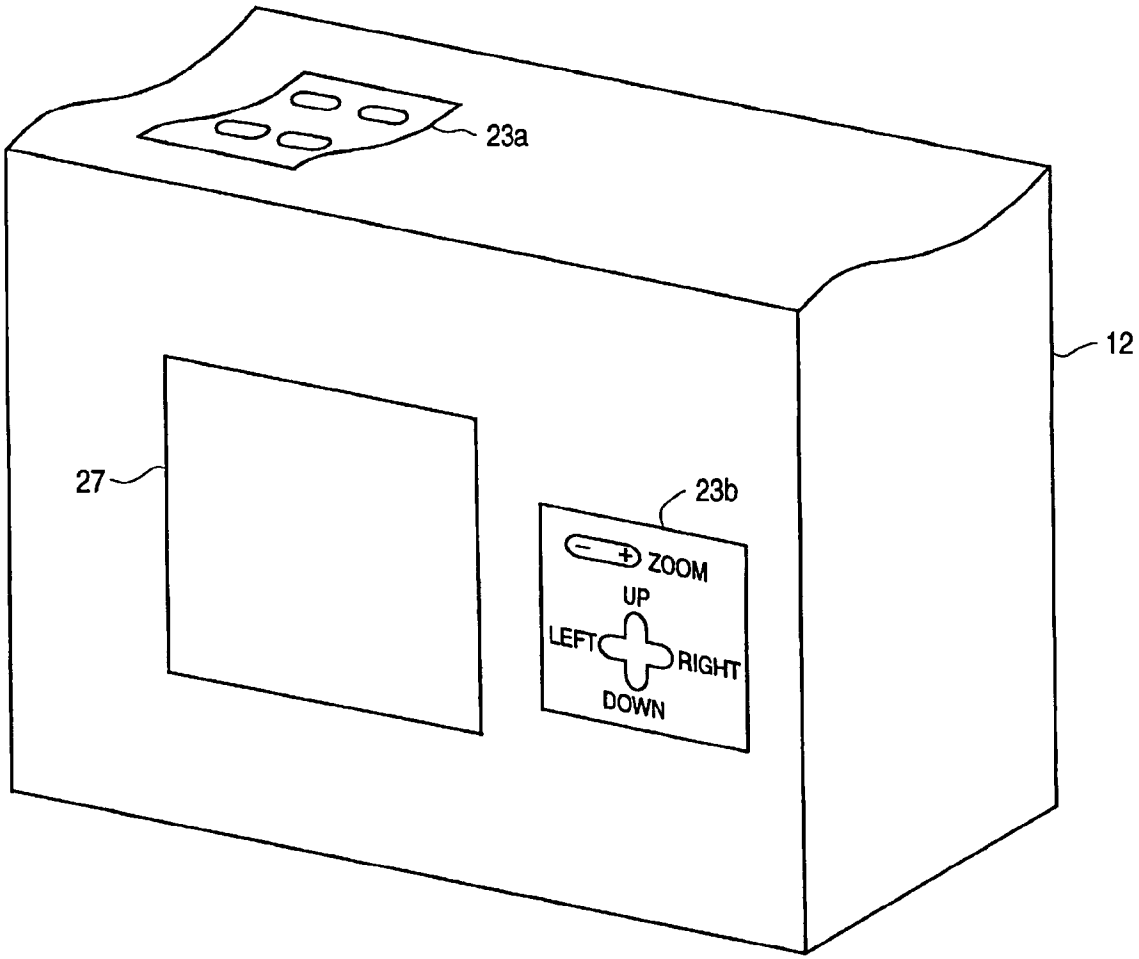
FIG. 5 illustrates control inputs on a VR camera according

FIG. 5 depicts a VR camera 12 that is equipped with a number of control buttons that are included in user input panels 23a and 23b. The buttons provided in user-input panel 23a vary depending on whether VR camera 12 is a video camera or a still-image camera. For example, in a still-image camera, panel 23a may include shutter speed and aperture control buttons, among others, to manage the quality of the photographed image. In a video camera, user input panel 23a may include, for example, zoom and focus control. User input panel 23a may also include mode control buttons to allow a user to select certain modes and options associated with creating and rendering virtual reality images. In one embodiment, for example, mode control buttons may be used to select a panoramic image capture mode, planar composite image capture mode or object image capture mode. Generally, any feature of the VR camera that can be selected, enabled or disabled may be controlled using the mode control buttons.

According to one embodiment of the present invention, view control buttons Right/Left, Up/Down and Zoom are provided in user input panel 23b to allow the user to select which portion of a panoramic image, planar composite image, object image or other multiple-view image is presented on display 27. When the user presses the Right button, for example, view control logic in the camera detects the input and causes the displayed view of a composite image or object image to pan right. When the user presses the Zoom+button, the view control logic causes the displayed image to be magnified. The view control logic may be implemented by a programmed processor (e.g., element 19 of FIG. 1), or by dedicated hardware. In one embodiment of the present invention, the view control logic will respond either to user input via panel 23b or to changes in camera orientation. Alternatively, the camera may be configured such that in one mode, view control is achieved by changing the VR camera orientation, and in another mode, view control is achieved via the user input panel 23b. In both cases, the user is provided with alternate ways to select a view of a multiple-view image.

Figure 6:
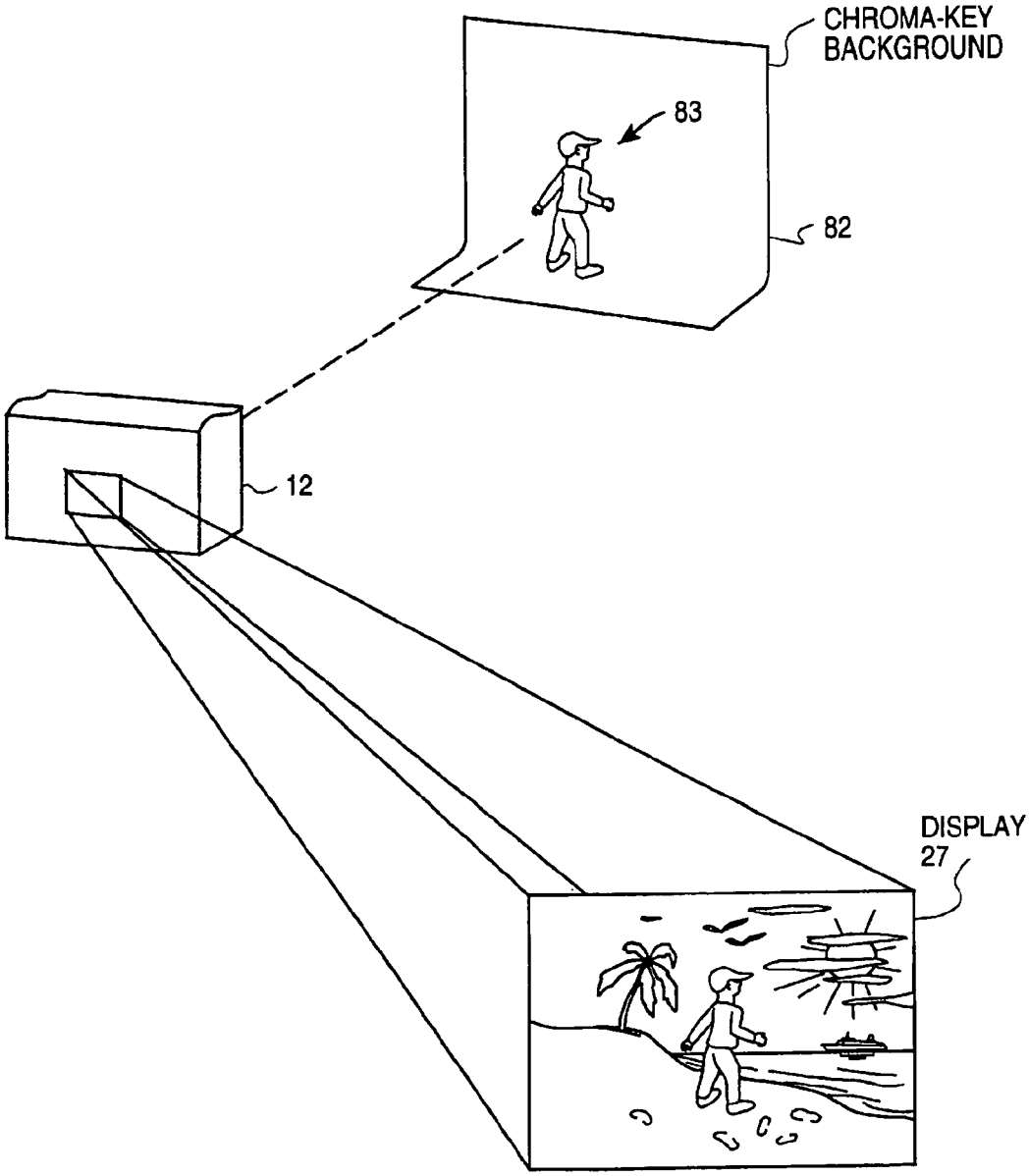
FIG. 6 illustrates the use of a VR camera to overlay a video feed over a previously recorded scene.

FIG. 6 illustrates yet another application of the VR camera 12 of the present invention. In this application, a video signal captured via the IAU (element 17 of FIG. 1) a is superimposed on a previously recorded scene using a chroma-key color replacement technique. For example, an individual 83 standing in front of a blue background 82 may be recorded using the VR camera 12 to generate a live video signal. Program code in the VR camera 12 may then be executed to implement an overlay function that replaces pixels in a displayed scene with non-blue pixels from the live video. The effect is to place the subject 83 of the live video in the previously generated scene. According to one embodiment of the present invention, the user may pan about a panoramic image on display 27 to locate a portion of the image into which the live video is to be inserted, then snap the overlaid subject of the video image into the scene. In effect, the later received image is made part of the earlier recorded panoramic image (or other multiple-view image) and the combined images can be permanently stored as a single recorded video or still image.

Figure 7:
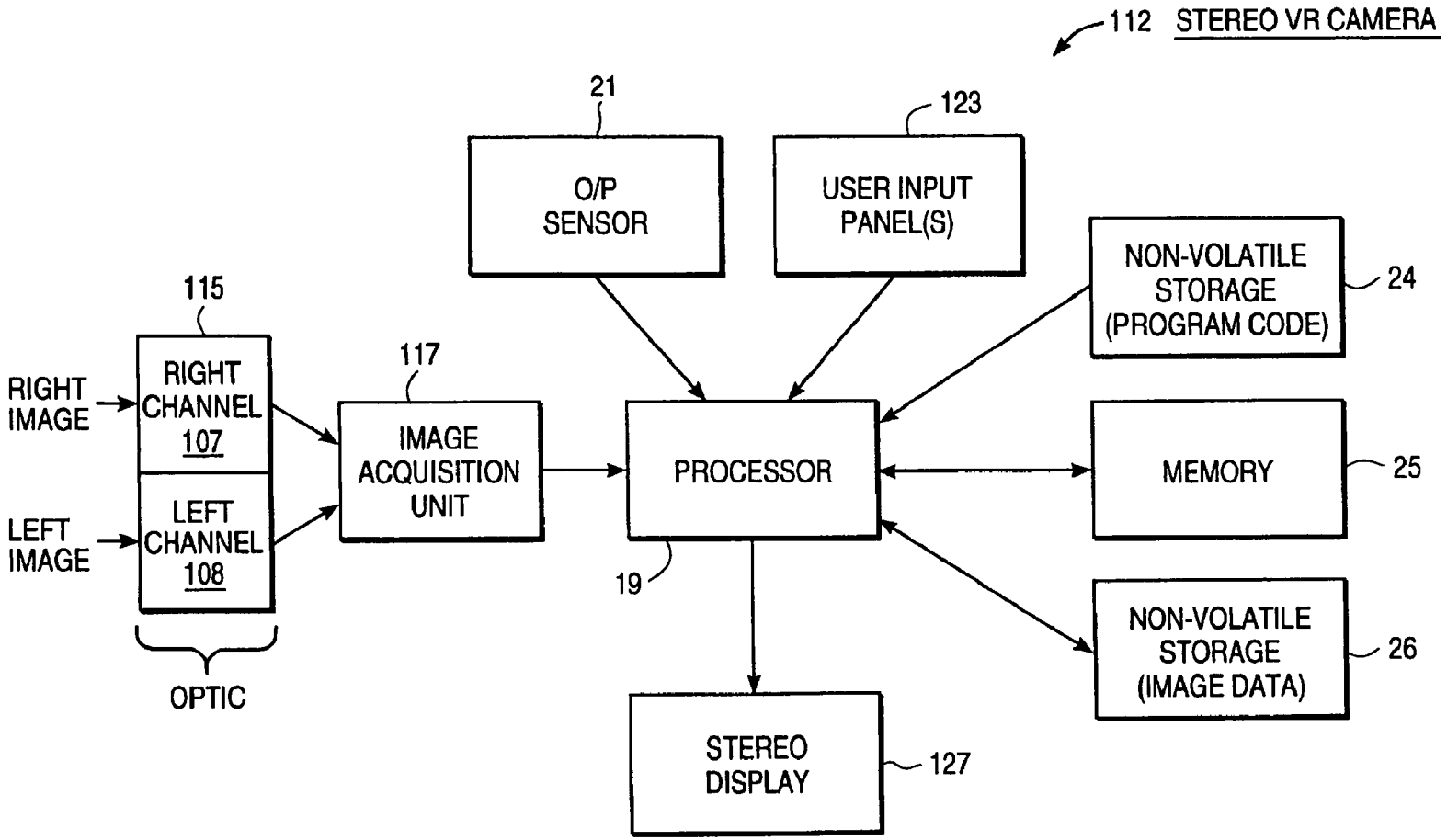
FIG. 7 is a block diagram of a stereo VR camera.

FIG. 7 is a block diagram of a VR camera 112 that is used to receive and process stereo images. As shown, the optic 115 includes both left and right channels (108, 107) for receiving respective left and right images. Typically the left and right images are of the same subject but from spatially differentiated viewpoints. This way a 3D view of the subject is captured. According to one embodiment of the present invention, the left and right images 108 and 107 are projected onto opposing halves of an image sensor in the IAU 117 where they are sampled by the processor 19 and stored in memory 25. Alternatively, multiple image sensors and associated sampling circuitry may be provided in the IAU 117. In either case, the left and right images are associated with orientation/position information obtained from the O/P sensor 21 in the manner described above, and stored in the memory 25. After two or more discrete images have been obtained, the processor may execute program code in the non-volatile code storage 24 to combine the left images into a left composite image and the right images into a right composite image. In an object image application, the processor combines the right and left images into respective right and left object images.

As shown in FIG. 7, a stereo display 127 is provided to allow a 3D view of a scene to be displayed. For example, a polarized LCD display that relies on the different viewing angles of the left and right eyes of an observer may be used. The different viewing angles of the observer's left and right eyes causes different images to be perceived by the left and right eyes. Consequently, based on an orientation/position of the camera, or a view select input from the user, a selected portion of the left composite image (or object image) is presented to the left eye and a selected portion of the right composite image (or object image) is presented to the right eye.

As with the VR camera 12 described above, live stereo video received in the IAU 117 of the stereo VR camera 112 may be overlaid on a previously generated composite image or object image. The left and right video components of the live stereo video may be superimposed over the left and right composite or object images, respectively. Consequently, the user may view live video subjects in 3D as though they were present in the previously recorded 3D scene. A stereo photograph may also be overlaid on an earlier recorded composite image or object image.

Figure 8:
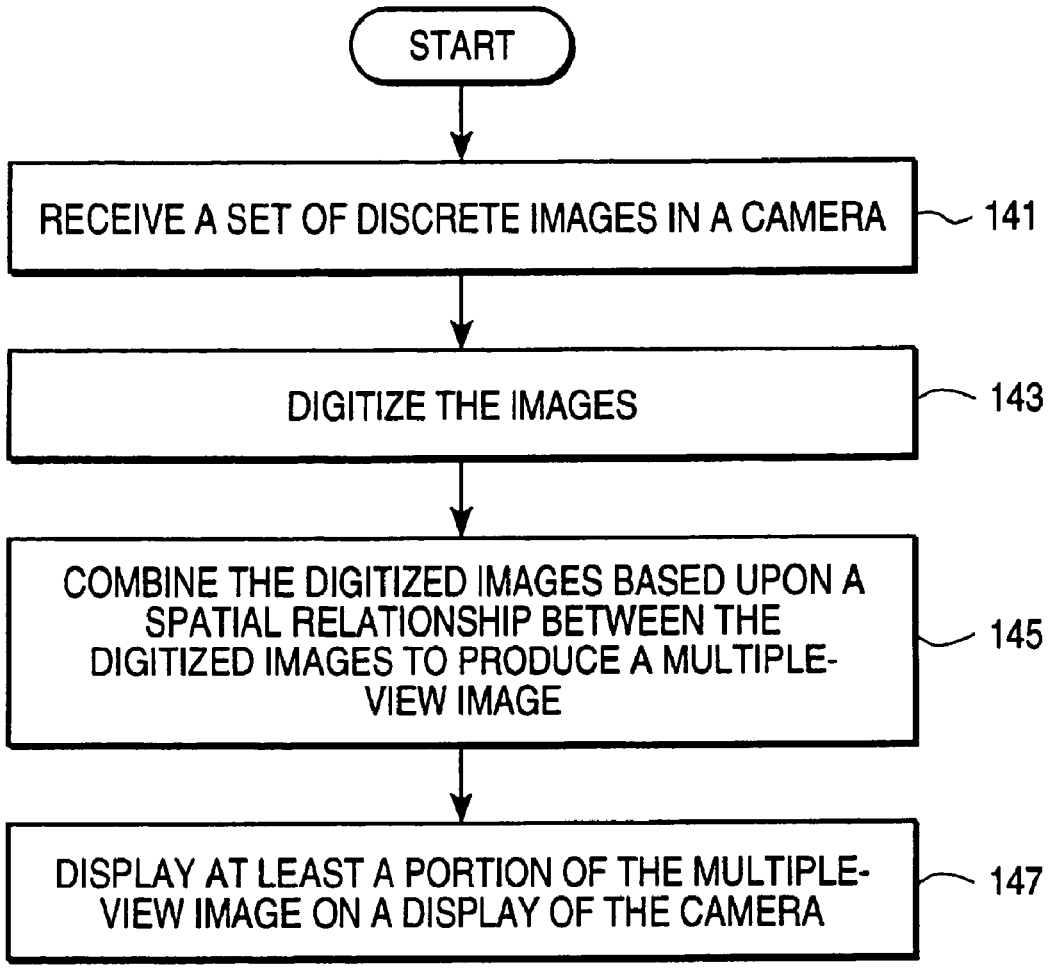
FIG. 8 is a diagram of a method according to one embodiment of the present invention.

FIG. 8 is a diagram of a method according to one embodiment of the present invention. At step 141, a set of discrete images are received in the camera. The images are digitized at step 143. Based upon a spatial relationship between the digitized images, the digitized images are combined to produce a multiple-view image at step 143. Then, at step 145, at least a portion of the multiple-view image is displayed on a display of the camera.

It will be appreciated from the foregoing description of the present invention that the steps of receiving (141), digitizing (143) and combining (145) may be performed on an image by image basis so that each image is received, digitized and combined with one or more previously received and digitized images before a next image is received and digitized.

Figure 9:
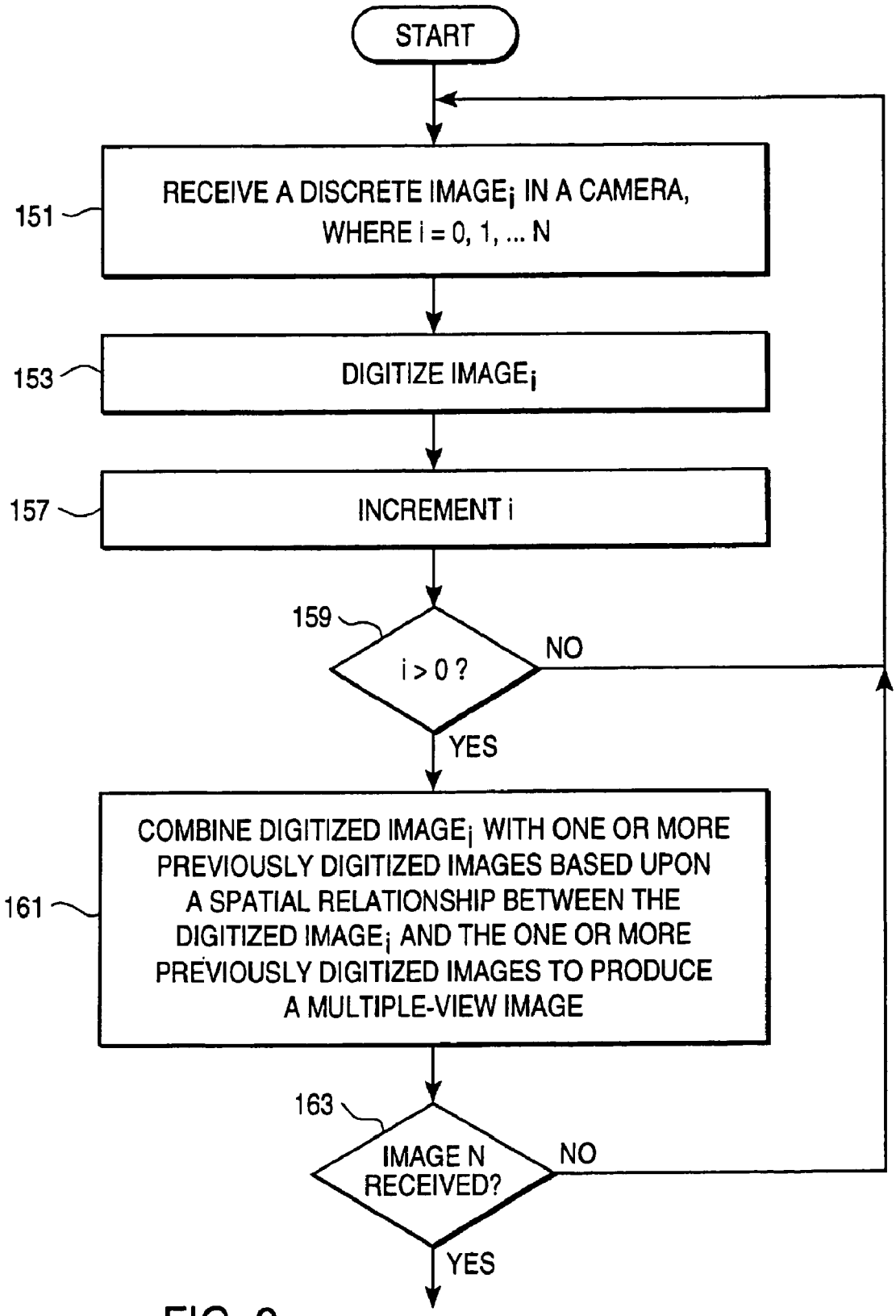
FIG. 9 is a diagram of a method according to an alternate embodiment of the present invention.

A method of generating of a multiple-view image on a discrete image by discrete image basis shown in FIG. 9. At step 151, a discrete $image_i$ is received, where i ranges from 0 to N. At step 153, image, is digitized, and i is incremented at step 157. If i is determined to be less than or equal to one at step 159, execution loops back to step 151 to receive the next discrete $image_i$. If i is greater than one, then at step 161 digitized $image_i$ is combined with one or more previously digitized images based on a spatial relationship between the digitized $image_i$ and the one or more previously digitized images to produce a multiple-view image. If it is determined that a final image has been received and digitized, (arbitrarily shown as N in step 163) the method is exited. It will be appreciated that the determination as to whether a final image has been received may be made in a number of ways, including: detecting that a predetermined number of images have been received, digitized and combined; or receiving a signal from the user or an internally generated signal indicating that a desired or threshold number of images have been received, digitized and combined into the multiple-view image. Also, according to one embodiment of the present invention, the user may select a portion of the multiple-view image for viewing any time after an initial combining step 159 has been performed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A hand-held camera comprising:

a camera housing;

a camera lens mounted on said *camera* housing;

image acquisition circuitry located within said camera housing for acquiring images of fields of view via said camera lens at various orientations of said camera housing;

at least one user input panel for receiving a user request to select a panoramic or non-panoramic image capture mode; and image processing circuitry located within said camera housing; responsive to the panoramic image capture mode selection, for at least partially combining each successively acquired image of a field of a view with previously acquired images of fields of view, on an image by image basis in real time, by determining spatial relationships between the images of fields of view, and by mapping the images of fields of view onto regions of a cylindrical surface, based on the spatial relationships.

2. The hand-held camera of claim 1 wherein said image processing circuitry determines spatial relationships between the images based on at least one feature in images that at least partially overlap.

3. The hand-held camera of claim 1 wherein said image processing circuitry determines spatial relationships between the images based on cross-correlations of images that at least partially overlap.

4. The hand-held camera of claim 1 wherein said image processing circuitry determines spatial relationships between the images based on the orientations of said camera housing during image acquisition.

5. The hand-held [cameral] *camera* of claim 4 further comprising a sensor for detecting the orientations of said camera housing.

6. The hand-held camera of claim 5 wherein said image acquisition circuitry uses orientation information from said sensor to automatically determine fields of view for which to acquire images thereof.

7. The hand-held camera of claim 1 wherein the camera is a video camera and wherein sampling logic digitizes the images at a predetermined rate.

8. A hand-held camera comprising:

a camera housing;

a camera lens mounted on said *camera* housing;

a display mounted on said camera housing;

image acquisition circuitry located within said [cameral] *camera* housing for acquiring images of fields of view via said camera lens at various orientations of said camera housing;

image processing circuitry located within said camera housing for at least partially combining each successively acquired image of a field of view with previously acquired images of fields of view, on an image by image basis in real time, by determining spatial relationships between the images of fields of view, and by mapping the images of fields of view onto regions of a cylindrical surface, based on spatial relationships;

at least one user input panel to select a panoramic or non-panoramic image view mode, and to receive a user request to display a spatial region of the cylindrical panoramic image on said display; and view control circuitry, located within said camera housing and responsive to the panoramic *image* view mode, to display a spatial region of the cylindrical panoramic image on said display, wherein said view control circuitry selects the spatial region of the cylindrical panoramic image based upon the user request.

9. The hand-held camera of claim 8 wherein said view control circuitry selects the spatial region of the cylindrical panoramic image to be displayed on said display based upon an orientation of said housing.

10. The hand-held camera of claim 9 further comprising a sensor for detecting the orientation of said camera housing.

11. The hand-held camera of claim 8 further comprising a sensor for detecting the orientation of said camera housing.

12. The hand-held camera of claim 8 wherein said user input panel receives user requests to pan about a panoramic image.

13. The hand-held camera of claim 12 wherein said user input panel comprises left, right, up and down buttons.

14. The hand-held camera of claim 12 further comprising a sensor for detecting the orientation of said camera housing.

15. The hand-held camera of claim 8 wherein said user input panel receives user requests to zoom in and out of a panoramic image.

16. The hand-held camera of claim 15 wherein said user input panel comprises zoom in and zoom out buttons.

17. The hand-held camera of claim 15 further comprising a sensor for detecting the orientation of said camera housing.

18. A method for providing cylindrical panoramic images comprising:

selecting a panoramic or non-panoramic image capture mode;

acquiring images of fields of view at various orientations of a camera; and when the panoramic image capture mode is selected, at least partially combining each successively acquired image of a field of view with previously acquired images of fields of view, on an image by image basis in real time, comprising:

determining spatial relationships between the image of fields of view; and mapping the images of fields of view onto regions of a cylindrical surface, based on the spatial relationships.

19. The method of claim 18 wherein said determining is based on at least one feature in images that at least partially overlap.

20. The method of claim 18 wherein said determining is based on cross-correlations of images that at least partially overlap.

21. The method of claim 18 wherein said determining is based on the orientations of the [cameral] *camera* during image acquisitions.

22. The method of claim 21 further comprising detecting the orientation of said camera housing.

23. The method of claim 22 further comprising automatically determining fields of view for which to acquire images thereof, based on detected orientation information.

24. A method for providing cylindrical panoramic images comprising:

acquiring images of fields of view at various orientations of a camera;

at least partially combining each successively acquired image of a field[s] of view with previously acquired images of fields of view, on an image by image basis in real time, comprising:

determining spatial relationships between the images of fields of view; and mapping the images of fields of view onto regions of a cylindrical surface, based on the spatial relationships;

selecting a panoramic or non-panoramic image view mode;

when the panoramic image view mode is selected, receiving a user request to display a spatial region of a cylindrical panoramic image; and displaying the spatial region of the cylindrical panoramic image.

25. The method of claim 24 further comprising selecting the spatial region of the cylindrical panoramic image to be displayed based upon an orientation of the camera.

26. The method of claim 25 further comprising detecting the orientation of said camera housing.

27. A hand-held camera comprising:

a camera housing;

a camera lens mounted on said *camera* housing;

image acquisition circuitry located within said camera housing for acquiring images of fields of view via said camera lens at various orientations of said camera housing;

at least one user input panel for receiving a user request to select a panoramic or non-panoramic image capture mode; and image processing circuitry located within said camera housing, responsive to the panoramic image capture mode selection, for at least partially combining each successively acquired image of a field of view with previously acquired images of fields of view, on an image by image basis in real time, by determining spatial relationships between the images of fields of view, and by mapping the images of fields of view onto regions of a spherical surface, based on the spatial relationships.

28. The hand-held camera of claim 27 [herein] *wherein* the camera is a video camera and wherein sampling logic digitizes the images at a predetermined rate.

29. A hand-held camera comprising:

a [careen] *camera* housing;

a camera lens mounted on said *camera* housing;

image acquisition circuitry located within said camera housing for acquiring images of fields of view via said camera lens at various orientations of said camera housing;

at least one user input panel for receiving a user request to select a panoramic or non-panoramic image capture mode; and image processing circuitry located within said camera housing, responsive to the panoramic image capture mode selection, for at least partially combining each successively acquired images of a field of view with previously acquired images of fields of view, on an image by image basis in real time, by mapping the image[s] of fields of view onto regions of a cylindrical surface, based on spatial relationships between the images of fields of view.

30. The hand-held camera of claim 29 wherein the camera is a video camera and wherein sampling logic digitizes the images at a predetermined rate.

31. A hand-held camera comprising:

a camera housing;

a camera lens mounted on said *camera* housing;

image acquisition circuitry located within said camera housing for acquiring images of fields of view via said camera lens at various orientations of said camera housing;

at least one user input panel for receiving a user request to select a panoramic or non-panoramic image capture mode; and image processing circuitry located within said camera housing, responsive to the panoramic image capture mode selection, for at least partially combining each successively acquired image of a field of view with previously acquired *images of* fields of view, on an image by image basis in real time, by [napping] *mapping* the images of fields of view onto regions of a spherical surface, based on spatial relationships between the images of fields of view.

32. The hand-held camera of claim 31 wherein the camera is a video camera and wherein sampling logic digitizes the images at a predetermined rate.

[33. A method for providing spherical panoramic images comprising:

selecting a panoramic or non-panoramic image capture mode;

acquiring images of fields of view at various orientations of a camera; and when the panoramic image capture mode is selected, at least partially combining each successively acquired image of a field of view with previously acquired images of fields of view, on an image by image basis in real time, comprising:

determining spatial relationships between the images of fields of view; and mapping the images of fields of view onto regions of a spherical surface, based on the spatial relationships.]

[34. A method for providing cylindrical panoramic images comprising:

selecting a panoramic or non-panoramic image capture mode;

acquiring images of fields of view at various orientations of a camera; and when the panoramic image capture mode is selected, at least partially combining each successively acquired image of a field of view with previously acquired images of fields of view, on an image by image basis in real time, comprising mapping the images of fields of view onto regions of a cylindrical surface, based on spatial relationships between the images of fields of view.]

[35. A method for providing spherical panoramic images comprising:

selecting a panoramic or non-panoramic image capture mode;

acquiring images of fields of view at various orientations of a camera; and when the panoramic image capture mode is selected, at least partially combining each successively acquired image of a field of view with previously acquired image of fields of view, on an image by image basis in real time, comprising mapping the images of fields of view onto regions of a spherical surface, based on spatial relationships between the images of fields of view.]

*36. A camera comprising*

*a housing;*

*a lens mounted on said housing;*

*image acquisition circuitry located within said housing for acquiring images of fields of view via said lens at various orientations of said housing;*

*at least one input panel for receiving a request to select a panoramic or non-panoramic image capture mode; and*

*image processing circuitry located within said housing and responsive to the panoramic image capture mode selection, for at least partially combining each successively acquired image of a field of a view with previously acquired images of fields of view, on an image-by-image basis in real time, by determining spatial relationships between the images of fields of view, and by mapping the images of fields of view onto regions of a smooth surface, based on the spatial relationships.*

*37. A camera, comprising:*

*a housing;*

*a lens mounted on the housing;*

*image acquisition circuitry located within the housing for acquiring images of fields of view via the lens at various orientations of the housing;*

*at least one input panel for receiving a selection of a panoramic or a non-panoramic image capture mode; and*

*image processing circuitry located within the housing, responsive to the panoramic image capture mode selection for at least partially combining each successively acquired image of a field of a view with at least one previously acquired image of a field of view on an image-by-image basis in real time based at least in part on at least one spatial relationship between the images of fields of view, by mapping the images of fields of view onto regions of a surface based at least in part on at least one spatial relationship.*

*38. A camera according to claim 37, wherein the image processing circuitry is capable of determining at least one spatial relationship between the images based at least partially on at least one feature in the images that at least partially overlap.*

*39. The camera according to claim 37, wherein the image processing circuitry is capable of determining at least one spatial relationship between the images based at least partially on a cross-correlation of images that at least partially overlap.*

*40. The camera according to claim 37, wherein the image processing circuitry is capable of determining at least one spatial relationship between the images based at least partially on an orientation of the housing during image acquisition.*

*41. The camera according to claim 40, further comprising a sensor capable of detecting an orientation of the housing.*

*42. The camera according to claim 41, wherein the sensor is capable of detecting at least one of a pitch, yaw and roll orientation of the housing based at least in part on a fixed reference.*

*43. The camera according to claim 41, wherein the sensor is capable of detecting an orientation of the housing based at least in part on a gravitational field of the earth.*

*44. The camera according to claim 41, wherein the sensor is capable of detecting an orientation of the housing based at least in part on a magnetic field of the earth.*

*45. The camera according to claim 41, wherein the sensor is capable of generating orientation information corresponding to a detected orientation of the housing, and*

*wherein the image acquisition circuitry is capable of using orientation information to automatically determine fields of view for which to acquire images thereof.*

*46. The camera according to claim 37, wherein the camera comprises a video camera, and*

*wherein the camera comprises sampling logic capable of digitizing the images.*

*47. A camera, comprising:*

*a housing;*

*a lens mounted on the housing;*

*a display mounted on the housing;*

*image acquisition circuitry located within the housing capable of successively acquiring images of fields of view via the lens at various orientations of the camera housing;*

*image processing circuitry located within the housing capable of at least partially combining each successively acquired image of a field of view with a previously acquired image of a field of view on an image-by-image basis in real time based at least in part on at least one spatial relationship between the images of fields of view by mapping the images of fields of view onto regions of a surface to form a panoramic image based at least in part on spatial relationships;*

*at least one input panel capable of receiving a panoramic-image view mode selection, and capable of receiving a request to display a selected spatial region of the panoramic image on the display; and*

*view-control circuitry, located within the housing, capable of displaying the selected spatial region of the panoramic image on the display in response to the panoramic-image view mode selection.*

*48. The camera according to claim 47, wherein the view control circuitry is capable of enabling a selection of the spatial region of the panoramic image to be displayed on the display based at least in part on an orientation of the housing.*

*49. The camera according to claim 48, wherein the input panel is capable of receiving a request to pan about a panoramic image.*

*50. The camera according to claim 49, wherein the input panel comprises left, right, up and down buttons.*

*51. The camera according to claim 49, wherein the input panel is capable of receiving requests to zoom in and out of a panoramic image.*

*52. The camera according to claim 51, wherein the input panel comprises zoom in and zoom out buttons.*

*53. The camera according to claim 47, further comprising a sensor capable of detecting an orientation of the housing.*

*54. The camera according to claim 53, wherein the sensor is capable of detecting at least one of a pitch, yaw and roll orientation of the housing based at least in part on a fixed reference.*

*55. The camera according to claim 53, wherein the sensor is capable of detecting the orientation of the housing based at least in part on a gravitational field of the earth.*

*56. The camera according to claim 53, wherein the sensor is capable of detecting the orientation of the housing based at least in part on a magnetic field of the earth.*

*57. The camera according to claim 53, wherein the sensor is capable of generating orientation information corresponding to detected orientations of the housing, and*

*wherein the image acquisition circuitry is capable of using the orientation information to automatically determine fields of view for which to acquire images thereof.*

*58. A camera, comprising:*

*a housing;*

*a lens mounted on the housing;*

*image acquisition circuitry located within the housing capable of acquiring images of fields of view via the lens at various orientations of the camera housing;*

*at least one input panel capable of receiving a panoramic-image capture mode selection; and*

*image processing circuitry located within the housing, responsive to the panoramic-image capture mode selection, capable of at least partially combining each successively acquired image of a field of view with a previously acquired image of a field of view on an image-by-image basis in real time by determining at least one spatial relationship between the images of fields of view, and by mapping the images of fields of view onto regions of a smooth surface based at least in part on at least one spatial relationship.*

*59. The camera of claim 58, wherein the camera comprises a video camera, and wherein the camera further comprises sampling logic capable of digitizing the images.*

*60. A camera, comprising:*

*a housing;*

*a lens mounted on housing;*

*image acquisition circuitry located within the housing capable of acquiring images of fields of view via the lens at various orientations of the housing;*

*at least one input panel capable of receiving a panoramic-image capture mode selection; and*

*image processing circuitry located within the housing, responsive to the panoramic-image capture mode selection, capable of at least partially combining each successively acquired image of a field of view with a previously acquired image of a field of view on an image-by-image basis in real time by mapping the images of fields of view onto regions of a surface based at least in part on at least one spatial relationship between the images of fields of view.*

*61. The camera of claim 60, wherein the camera comprises a video camera, and wherein the camera further comprises sampling logic capable of digitizing the images.*

*62. A camera, comprising:*

*a camera housing;*

*a camera lens mounted on the housing;*

*image acquisition circuitry located within the camera housing for acquiring images of fields of view via the camera lens at various orientations of the camera housing;*

*at least one input panel capable of receiving a panoramic-image capture mode selection; and*

*image processing circuitry located within the camera housing, responsive to the panoramic-image capture mode selection capable of at least partially combining each successively acquired image of a field of view with a previously acquired image of a field of view on an image-by-image basis in real time by mapping the images of fields of view onto regions of a surface based at least in part on at least one spatial relationship between the images of fields of view.*

*63. The camera of claim 62, wherein the camera comprises a video camera, and*

*wherein the camera further comprises sampling logic capable of digitizing the images.*

*64. A camera, comprising:*

*a housing;*

*a lens mounted on the housing;*

*means for acquiring images of fields of view via the lens at various orientations of the housing, the means for acquiring the image being located within the housing;*

*means for receiving a selection of a panoramic or a non-panoramic image capture mode; and*

*means for processing images located within the housing, the means for processing images responsive to the panoramic image capture mode selection for at least partially combining each successively acquired image of a field of a view with at least one previously acquired image of a field of view on an image-by-image basis in real time based at least in part on at least one spatial relationship between the images of fields of view, and for mapping the images of fields of view onto regions of a surface based at least in part on at least one spatial relationship.*

*65. A camera according to claim 64, wherein the means for processing images is capable of determining at least one*

*spatial relationship between the images based at least partially on at least one feature in the images that at least partially overlap.*

*66. The camera according to claim 64, wherein the means for processing images is capable of determining at least one spatial relationship between the images based at least partially on a cross-correlation of images that at least partially overlap.*

*67. The camera according to claim 64, wherein the means for processing images is capable of determining at least one spatial relationship between the images based at least partially on an orientation of the housing during image acquisition.*

*68. The camera according to claim 67, further comprising means for detecting an orientation of the housing.*

*69. The camera according to claim 68, wherein the means for detecting is further capable of detecting at least one of a pitch, yaw and roll orientation of the housing based at least in part on a fixed reference.*

*70. The camera according to claim 68, wherein the means for detecting is further capable of detecting an orientation of the housing based at least in part on a gravitational field of the earth.*

*71. The camera according to claim 68, wherein the means for detecting is further capable of detecting an orientation of the housing based at least in part on a magnetic field of the earth.*

*72. The camera according to claim 68, wherein the means for detecting is further capable of generating orientation information corresponding to a detected orientation of the housing, and*

*wherein the means for processing images is further capable of using orientation information to automatically determine fields of view for which to acquire images thereof.*

*73. The camera according to claim 64, wherein the camera comprises a video camera, and*

*wherein the camera comprises means for digitizing the images.*

*74. A camera, comprising:*

*a housing;*

*a lens mounted on the housing;*

*a display mounted on the housing;*

*means for acquiring images of fields of view via the lens at various orientations of the housing, the means for acquiring images being located within the housing and being capable of successively acquiring images;*

*image processing circuitry located within the housing capable of at least partially combining each successively acquired image of a field of view with a previously acquired image of a field of view on an image-by-image basis in real time based at least in part on at least one spatial relationship between the images of fields of view by mapping the images of fields of view onto regions of a surface to form a panoramic image based at least in part on spatial relationships;*

*means for receiving a panoramic-image view mode selection, and capable of receiving a request to display a selected spatial region of the panoramic image on the display; and*

*means for controlling a display, located within the housing, by displaying the selected spatial region of the panoramic image on the display in response to the panoramic-image view mode selection.*

*75. The camera according to claim 74, wherein the means for controlling a display is further capable of enabling a selection of the spatial region of the panoramic image to be displayed on the display based at least in part on an orientation of the housing.*

*76. The camera according to claim 75, wherein the means for receiving a panoramic-image view mode selection is further capable of receiving a request to pan about a panoramic image.*

*77. The camera according to claim 76, wherein the means for receiving a panoramic-image view mode selection comprises left, right, up and down buttons.*

*78. The camera according to claim 76, wherein the means for receiving a panoramic-image view mode selection is further capable of receiving requests to zoom in and out of a panoramic image.*

*79. The camera according to claim 78, wherein the means for receiving a panoramic-image view mode selection comprises zoom in and zoom out buttons.*

*80. The camera according to claim 74, further comprising means for detecting an orientation of the housing.*

*81. The camera according to claim 80, wherein the means for detecting an orientation is further capable of detecting at least one of a pitch, yaw and roll orientation of the housing based at least in part on a fixed reference.*

*82. The camera according to claim 80, wherein the means for detecting an orientation is further capable of detecting the orientation of the housing based at least in part on a gravitational field of the earth.*

*83. The camera according to claim 80, wherein the means for detecting an orientation is further capable of detecting the orientation of the housing based at least in part on a magnetic field of the earth.*

*84. The camera according to claim 80, wherein the means for detecting an orientation is further capable of generating orientation information corresponding to detected orientations of the housing, and*

*wherein the means for acquiring images of fields of view is further capable of using the orientation information to automatically determine fields of view for which to acquire images thereof.*

*85. A camera, comprising:*

*means for acquiring images of fields of view at various orientations of a camera;*

*means for at least partially combining each successively acquired image of fields of view with a previously acquired image of a field of view on an image-by-image basis in real time, comprising:*

*means for determining at least one spatial relationship between the images of fields of view; and*

*means for mapping the images of fields of view onto regions of a smooth surface based at least in part on at least one spatial relationship;*

*means for receiving a request to display a selected spatial region of a panoramic image; and*

*means for displaying the selected spatial region of the panoramic image.*

*86. The camera of claim 85, wherein the means for displaying comprises means for displaying the selected spatial region of the panoramic image based at least in part on an orientation of the camera.*

*87. The camera of claim 86, further comprising means for detecting an orientation of the camera.*

*88. A camera, comprising:*

*a housing;*

*a lens mounted on the housing;*

*means for acquiring images of fields of view via the lens at various orientations of the camera housing, the means for acquiring being located within the housing;*

*means for receiving a panoramic-image capture mode selection; and*

*means for processing images located within the housing, the means for processing images being responsive to the panoramic-image capture mode selection, being capable of at least partially combining each successively acquired image of a field of view with a previously acquired image of a field of view on an image-by-image basis in real time by determining at least one spatial relationship between the images of fields of view, and for mapping the images of fields of view onto regions of a smooth surface based at least in part on at least one spatial relationship.*

*89. The camera of claim 88, wherein the camera comprises a video camera, and wherein the camera further comprises means for digitizing the images.*

*90. A camera, comprising:*

*a housing;*

*a lens mounted on housing;*

*means for acquiring images of fields of view via the lens at various orientations of the housing, the means for acquiring being located within the housing;*

*means for receiving a panoramic-image capture mode selection; and*

*means for processing images located within the housing, the means for processing images being responsive to the panoramic-image capture mode selection and being capable of at least partially combining each successively acquired image of a field of view with a previously acquired image of field of view on an image-by-image basis in real time by mapping the images of fields of view onto regions of a surface based at least in part on at least one spatial relationship between the images of fields of view.*

*91. The camera of claim 90, wherein the camera comprises a video camera, and*

*wherein the camera further comprises means for digitizing the images.*

*92. A camera, comprising:*

*a camera housing;*

*a camera lens mounted on the housing;*

*means for acquiring images of fields of view via the camera lens at various orientations of the camera housing, the means for acquiring images being located within the camera housing;*

*means for receiving a panoramic-image capture mode selection; and*

*means for processing images located within the camera housing, the means for processing images being responsive to the panoramic-image capture mode selection and being capable of at least partially combining each successively acquired image of a field of view with a previously acquired field of view on an image-by-image basis in real time by mapping the images of fields of view onto regions of a surface based at least in part on at least one spatial relationship between the images of fields of view.*

*93. The camera of claim 92, wherein the camera comprises a video camera, and wherein the camera further comprises means for digitizing the images.*

*94. A camera comprising:*

*a camera housing;*

*a camera lens mounted on said housing;*

*image acquisition circuitry located within said camera housing to acquire images via said camera lens at at least two orientations of said camera housing;*

*means for selecting a panoramic image capture mode;*

*image processing circuitry located within said camera housing, responsive to the selection of the panoramic image capture mode, to at least partially combine at least one successively acquired image with at least one previously acquired image by mapping the images onto regions of a cylindrical surface wherein the mapping is based, at least in part, on one or more spatial relationships between the images as determined on an image-by-image basis in real time; and*

*a sensing element adapted to determine when a next image in said panoramic image capture mode is to be acquired based in response to detection of at least an orientation of said camera.*

*95. The camera of claim 94, wherein said orientation of the camera includes at least one orientation selected from the group consisting of a pitch, roll and yaw, all of said camera.*

*96. The camera of claim 94, wherein said sensing element includes means for generating a signal to indicate that said next image is to be acquired.*

*97. The camera of claim 96, wherein said signal includes at least one of an audio signal or a visible signal.*

*98. The camera of claim 94 wherein said sensing element determining is further adapted to determine when said next image is to be acquired based at least in part on an angle of view of the camera and a distance between the camera and a subject in successive images.*

*99. The camera of claim 94, further including means for collecting image information for each acquired image and for associating said image information for each acquired image with that image, said image information including a spatial location of an acquired image at least relative to spatial locations of other acquired images.*

*100. The camera of claim 99, wherein the collecting means is further adapted to generate a data structure associated with acquired images of a panorama, the data structure including a data member for each acquired image in the panorama, and each data member identifying at least one neighboring image to the acquired image represented by the data member and said data member including information representing camera orientation.*

*101. The camera of claim 100, wherein the data member further includes a spatial location of said image in said panorama relative to other images acquired for said panorama.*

*102. The camera of claim 101, wherein said spatial location of said image is represented by at least an angular and positional proximity to at least one of said other acquired images.*

*103. A method for providing cylindrical panoramic images comprising:*

*sensing selection of a panoramic image capture mode;*

*acquiring images at various orientations of a camera;*

*responsive to said selection of said panoramic image capture mode, at least partially combining at least one successively acquired image with one or more previously acquired images, on an image-by-image basis in real time, comprising:*

*determining spatial relationships between the images; and*

*mapping the images onto regions of a cylindrical surface, based on the spatial relationships; and*

*sensing an orientation of said camera to determine when a next image in said panoramic image capture mode is to be acquired based at least in part on a camera orientation.*

*104. The method of claim 103, wherein said orientation of the camera includes at least one orientation selected from the group consisting of a pitch, roll and yaw, all of said camera.*

*105. The method of claim 103, further comprising generating a signal to indicate that said next image is to be acquired.*

*106. The method of claim 105, wherein said signal includes at least one of an audio signal or a visible signal.*

*107. The method of claim 103 wherein said sensing to determine is further based at least in part on an angle of view of the camera and a distance between the camera and a subject in successive images.*

*108. The method of claim 103, further comprising collecting image information for each acquired image, and associating said image information for each acquired image with that image, said image information including a spatial location of an acquired image at least relative to spatial locations of other acquired images.*

*109. The method of claim 108, further comprising generating a data structure associated with acquired images of a panorama, the data structure including a data member for each acquired image in the panorama, and each data member identifying at least one neighboring image to the acquired image represented by the data member and said data member including information representing camera orientation.*

*110. The method of claim 108, wherein the data member further includes a spatial location of said image in said panorama relative to other images acquired for said panorama.*

*111. The method of claim 110, wherein said spatial location of said image is represented by at least an angular and positional proximity to at least one of said other acquired images.*

* * * * *

UNITED STATES PATENT AND TRADEMARK OFFICE

CERTIFICATE OF CORRECTION

PATENT NO. : RE43,700 E
APPLICATION NO. : 11/113455
DATED : October 2, 2012
INVENTOR(S) : Chen It is certified that error appears in the above-identified patent and that said Letters Patent is hereby corrected as shown below:

On the Title Page, in Item (56), under "OTHER PUBLICATIONS", in Column 2, Line 1, delete "J." and insert -- J., --, therefor.

On the Title Page, in Item (56), under "OTHER PUBLICATIONS", in Column 2, Line 8, delete "B." and insert -- B., --, therefor.

In the Specification

In Column 2, Line 46, after "according", insert -- to a preferred embodiment of the present invention --.

In Column 4, Line 3, delete "VR the" and insert -- the VR --, therefor.

In Column 4, Line 6, after "determined", insert -- by --, therefor.

In Column 4, Line 21, delete "the to" and insert -- the --, therefor.

In Column 4, Line 28, delete "on" and insert -- of --, therefor.

In Column 4, Line 39, delete "on" and insert -- of --, therefor.

In Column 5, Line 33, after "approximately", insert -- the --.

In Column 5, Line 45, delete "image" and insert -- images --, therefor.

In Column 6, Line 16, delete "latitude" and insert -- the latitudes --, therefor.

In Column 7, Line 25, delete "objec" and insert -- object --, therefor.

Signed and Sealed this
Thirteenth Day of August, 2013

Teresa Stanek Rea

Teresa Stanek Rea
*Acting Director of the United States Patent and Trademark Office*

In the Specification (cont'd.)

In Column 7, Line 47, delete "an object image".

In Column 8, Line 30, after "FIG. 1)", delete "a".

In Column 8, Lines 39-46, delete "According to one embodiment of the present invention, the user may pan about a panoramic image on display 27 to locate a portion of the image into which the live video is to be inserted, then snap the overlaid subject of the video image into the scene. In effect, the later received image is made part of the earlier recorded panoramic image (or other multiple-view image) and the combined images can be permanently stored as a single recorded video or still image." and insert the same as a new paragraph at Line 40.

In Column 9, Line 29, delete "step 143." and insert -- step 145. --, therefor.

In Column 9, Line 29, delete "step 145," and insert -- step 147, --, therefor.

In Column 9, Line 40, after "basis", insert -- is --.

In Column 9, Line 43, delete "one" and insert -- zero --, therefor.

In Column 9, Line 45, delete "one," and insert -- zero, --, therefor.

In Column 9, Line 61, delete "step 159" and insert -- step 161 --, therefor.

In the Claims

In Column 13, Line 54, in Claim 36, delete "comprising" and insert -- comprising: --, therefor.

In Column 14, Line 23, in Claim 38, delete "A camera" and insert -- The camera --, therefor.

In Column 16, Line 36, in Claim 62, delete "selection" and insert -- selection, --, therefor.

In Column 16, Line 66, in Claim 65, delete "A camera" and insert -- The camera --, therefor.